June 11, 1929.  T. ROBINSON  1,716,505
APPARATUS FOR MAKING PREPARED ROOFING
Original Filed April 14, 1926   2 Sheets-Sheet 1
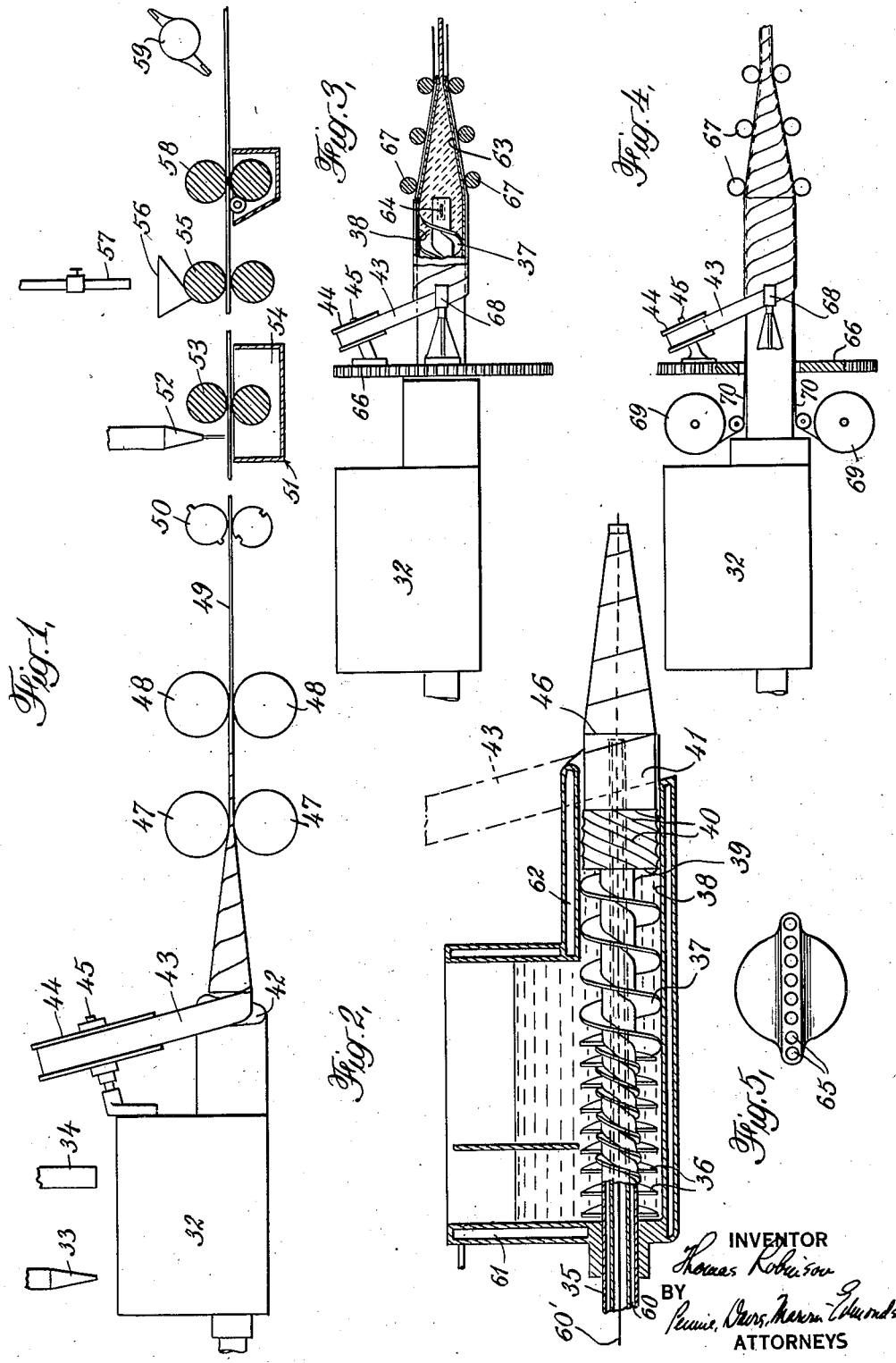

June 11, 1929. T. ROBINSON 1,716,505
APPARATUS FOR MAKING PREPARED ROOFING
Original Filed April 14, 1926 2 Sheets-Sheet 2
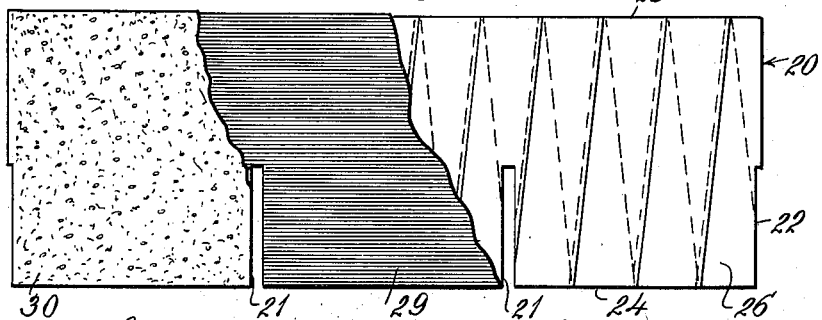
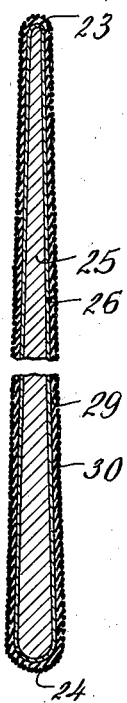
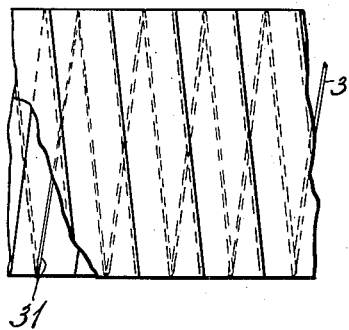
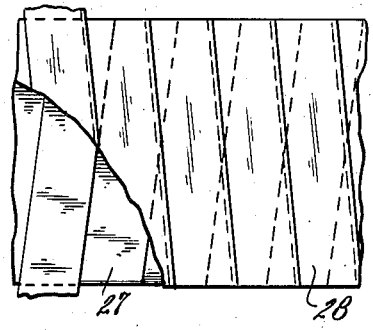
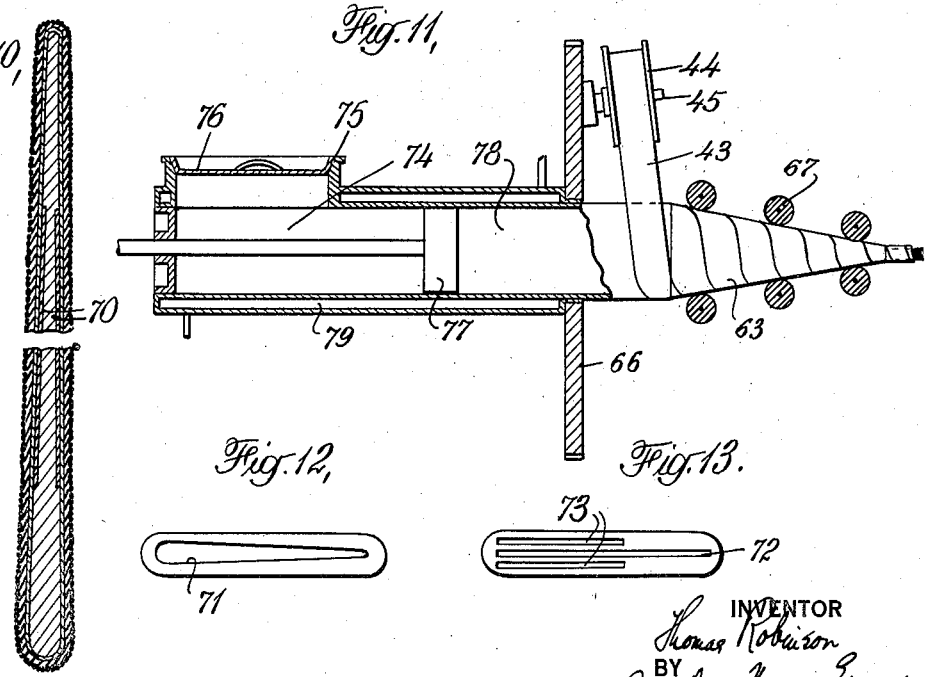
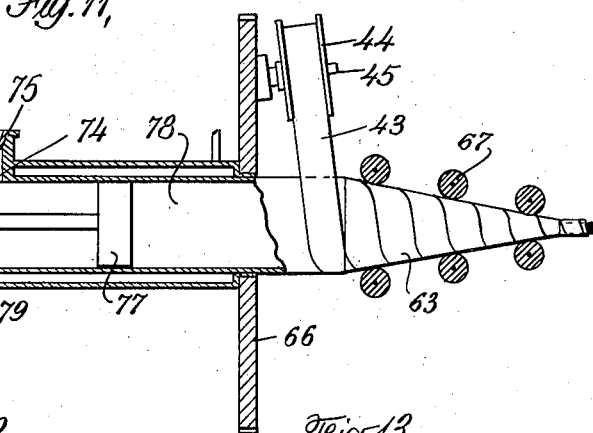
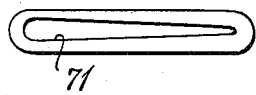
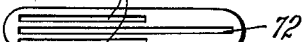
INVENTOR
Thomas Robinson
BY
ATTORNEYS Patented June 11, 1929.

1,716,505

UNITED STATES PATENT OFFICE.

THOMAS ROBINSON, OF NEW YORK, N. Y., ASSIGNOR TO LANCASTER ASPHALT, INC.

APPARATUS FOR MAKING PREPARED ROOFING.

Original application filed April 14, 1926, Serial No. 101,877. Divided and this application filed September 8, 1926. Serial No. 134,186.

This invention relates to the manufacture of building products suitable for roofing and other purposes and is concerned more particularly with the provision of apparatus for the manufacture of a novel building product illustrated and described in my copending application, Ser. No. 101,877, filed April 14, 1926, of which application the present one is a division.

The building material referred to comprises a core or base of a plastic character, which is waterproof and becomes substantially rigid on setting. This core may consist of various materials, as, for example, of a mastic consisting of finely divided mineral material and a bituminous product such as asphalt. The core formed to the desired shape is wholly encased within a jacket which is preferably a continuous wrapping of helical shape laid on the core while the latter is being produced. Such a jacket may be made by winding a strip of impregnated paper about the core and this jacket may include a suitable reinforcement such as a wire. After the wrapping is laid on the core, the wrapping and such parts of the core as are exposed are coated with a sealing layer of a waterproofing compound of suitable physical properties, and then a wear surface may be applied on such parts of the element as may be desired. The new building product may be made in any desired shape but is particularly useful for roofing purposes in the form of the ordinary strip shingle of commerce.

The present invention is directed to the provision of apparatus by which this new material may be rapidly and cheaply produced and in one form includes a housing containing a screw arranged to agitate the mixture forming the core and to discharge it from a suitable orifice. The screw terminates at the discharge end in a mandrel which projects beyond the housing and in the operation of the device a continuous tubular layer of material is forced along the surface of the mandrel. Near the latter is a supply of the jacket material, and it is laid about the tubular layer as the latter is forced along the mandrel. This jacket serves to encase and support the tubular core, and the enclosed core is discharged from the end of the mandrel and at once passes through shaping rolls which consolidate the core tube into a web of suitable cross-section. Beyond the first shaping rolls are others which give the encased core the final shape, and the core is then led through devices which cut notches in one edge, in the event that strip shingles are to be the final product. From the notching cutters, the core with its jacket passes through coating devices, and finally receives its wear surface and final coating and is cut into units of the desired length.

For a better understanding of the invention, reference will be made to the accompanying drawings, in which, Fig. 1 is a diagrammatic view in side elevation illustrating the apparatus, Fig. 2 is a view in vertical section and partly in elevation showing the extrusion device, Fig. 3 is a side view partly in section showing a different form of the extrusion device, Fig. 4 is a similar view showing a modification, Fig. 5 is an end view of an extrusion nozzle, Fig. 6 is a view in elevation of the new product with parts broken away.

Fig. 7 is a similar view of a reinforced jacket,

Fig. 8 is a view in transverse section of one type of the product,

Fig. 9 is a view in elevation of a modified type of double jacket,

Fig. 10 is a view in transverse section of a modified type of the product,

Fig. 11 is a view partly in elevation and partly in section of a modified form of the apparatus, and Figs. 12 and 13 are end views of modified nozzle members.

Referring now to these drawings, the new roofing product is shown in one form in Fig. 6, this product being a strip shingle of the shape and size now widely sold commercially. The element 20 consists of a strip of generally oblong shape, for example 10″ x 36″ approximately, and having notches 21 cut in its forward edge. Notches of half size are cut in the end of the strip as at 22, and when a plurality of these strips are laid end to end on the roof in overlapping courses, with the rear ends of the cutouts of one course concealed by the forward ends of the shingles of the course above, the roof has the appearance of being covered with single shingles spaced apart in the usual manner.

The element 20 is preferably made of tapering cross-section, its rear edge 23 being relatively thin and its forward edge 24 having a considerable thickness. When such an element is laid on the roof, the forward edge 24 is exposed and on account of its increased thickness it gives the element an appearance of solidity which is highly desirable and greatly increases its marketability.

This element consists of a core 25 which may be made of numerous materials. The core is a hardened plastic composition, and is preferably waterproof. Among the materials which may be used for the purpose are bituminous mastics consisting of a bituminous substance, such as asphalt and fibrous or granular materials, such as crushed slate, asbestos, or asbestos sand, which is a commercial product and consists of fine asbestos particles mixed with small quantities of gangue. Asbestos cement compositions which harden on setting, may also be used and if desired the core material may include small quantities of neat cement. Probably the most satisfactory material for the purpose consists of asphalt and asbestos sand, and this material is mixed in proper proportions so that when it sets it will have a considerable rigidity. The asphalt and asbestos sand are both comparatively cheap products available in large quantities, and are easily handled in the manufacture of the core.

About the core is laid a jacket 26 which consists of a wrapping continuously laid about the core, as, for instance, in a number of partially overlapping convolutions, as illustrated in Fig. 6. It is preferable, in producing this jacket, to employ a webbing or strip of material, such as an impregnated paper, which is relatively narrow so that a large number of convolutions of the strip are required to cover the core. This jacket, when complete, covers the front and rear faces of the core and also extends around the front and rear edges. The only joints in the jacket are those which occur where two convolutions are partly overlapped and as will readily be seen, these joints are covered by the sealing layer.

If desired, the jacket may consist of more than one layer of the strip, as shown in Fig. 9, where the under layer 27 is wound in one direction helically about the core and the outer jacket 28 is wound helically but in the reverse direction. Numerous materials may be employed for the production of the jacket, as, for example, coarse paper, either impregnated or not impregnated, strips of asbestos paper, burlap, or various other products of this type. Preferably the jacket is made of a relatively narrow strip, so that a number of convolutions are required to cover the core and the core is strengthened by the increased thicknesses of the material at the joints, these thicknesses forming ribs. By using a narrow strip, a large number of such reinforcing ribs are produced from one end of the core to the other, and by winding the strips helically about the core, the application of the jacket is a simple operation. The jacket may be generally designated as a flexible fibrous material.

Enclosing the jacket with the core inside of it, is a sealing layer 29 which may be of various materials of a waterproof character, and the selected material should preferably be one which will harden on setting and will withstand solar heat. For this purpose, there are various grades of asphalt, such as "blown" asphalt, which meet the requirements. Preferably in the production of the article the notches 21 are produced prior to the application of the sealing layer, so that the layer covers such portions of the core as are exposed in the operation of cutting the notches. After the sealing layer is applied, a wear surface 30 of suitable material may be affixed by means of the sealing material. Wear surfacing materials suitable for the purpose are crushed slate, sand, fine gravel, and other materials of this general type.

If desired, the core may be strengthened by the application of a reinforcing strand, such as a wire 31, which is preferably wound about the core a plurality of times and may be conveniently applied at the same time that the jacket is put in position. Preferably the reinforcing strand will be laid inside the jacket, so that it will be pressed into the core material while the latter is soft, and will thus not form ridges in the finished product. By wrapping the reinforcing material about the core at the same time the jacket is applied, the reinforcement will extend about the core a number of times and give the finished product a considerable rigidity.

In the production of the new product, which, it is to be understood, may be made in various forms other than the strip shingle referred to, the new apparatus used is illustrated diagrammatically in Fig. 1. The ingredients of the core are introduced into an agitator chamber 32 and may be supplied by nozzles 33 and 34. For example, in the production of an article containing a core of asbestos sand and asphalt, the asphalt may be introduced through the nozzle 33 and sand through the spout 34. In the agitator chamber is a shaft 35 carrying beater blades 36, this shaft being suitably driven from any convenient source of power. The rotation of the shaft causes the materials to be thoroughly stirred and mixed within the chamber and beyond the beater blades the shaft carries a worm 37, arranged to convey the material through an outlet extension 38. Near the end of this extension the shaft carries a mandrel 39 which fits relatively closely within the extension and is formed with ribs 40 of helical shape which extend about the mandrel. Beyond the ribs the mandrel has a cylindrical part 41 and the outlet extension is cut away as indicated at 42, so that a narrow web 43 drawn from the supply roll 44 mounted on a stud 45 at any convenient part of the machine, may be wrapped about the core as the latter is formed.

In the operation of the device, the asbestos, sand and asphalt within the hopper chamber 32 are thoroughly mixed and agitated, then forced along by the conveyor screw 37 and continuously discharged through the channels between the ribs 40. The material forced outwardly through these channels is laid in the form of a plurality of narrow strips on the surface of the cylindrical part of the mandrel 41, and as these strips are carried over the surface of the mandrel the rotation of the latter draws the jacket strip 43 from the supply and causes the strip to be continuously wound about the core. Beyond the end 46 of the cylindrical portion of the mandrel, the core, which is now of tubular form, adheres to the inner surfaces of the strips and the tube, consisting of the core encased in the wrapping, may collapse slightly. The collapse is assisted by driven shaping rolls 47 through which the core with its encasing wrapper next passes. These rolls are driven at the proper speed with reference to the production of the wrapped core so that no tension is placed on the core but it passes through the rolls as rapidly as it is formed. These rolls cause the core material within the wrapping to be consolidated and force the wrapping into intimate contact with the core. If the finished product is to have a tapering cross-section, the pass through the rolls will be of tapering shape corresponding in general to the cross-section of the product. Beyond the rolls 47 are finishing shaping rolls 48, also driven at proper speed with reference to the production of the core with its jacket, so as to exert no drawing action, and these rolls 48 further compact the core and give the product its final cross-sectional contour.

In the event that strip shingles are to be made, the continuous wrapped core 49 coming from the shaping rolls, next passes through notching cutters 50, which are of suitable form and are operated at the proper speed so as to produce cut-out notches in the edge of the core, these notches being of the desired shape and spacing. Beyond the notching cutters the encased core passes through coating devices, generally designated 51. These devices may include a nozzle 52 through which the sealing material is applied to one face of the core, and beyond this nozzle are rolls 53, one of which runs in a vat 54 and applies the sealing material to the under surface of the core. The coated material is next led through a coating device, generally designated 55 and arranged to apply the wear surfacing material. This coating device includes a hopper 56 into which the material flows from a spout 57 and the material is deposited on the face of the coated core and embedded therein by the action of the rolls. Beyond the coating device 55 is another device generally designated 56 which may apply talc or other similar material to the rear face of the strip. Beyond the device 58 is a cutting device, illustrated diagrammatically at 59, by which the strip is cut into units of any desired length. These units are then prepared for shipment, as by being bundled together.

It will be observed that by means of this apparatus the core material is continuously extruded through an orifice to form a tube, which is wrapped in the core material as rapidly as it is formed. The tube encased in the wrapping is then collapsed so that the core is compacted into a solid mass, and thereafter the jacketed core is shaped to appropriate form, notched, coated with the desired materials, and then cut in suitable lengths. In the collapse of the core, the air which is contained therein must be permitted to escape, and for this purpose the shaft 35 is made hollow, as shown in Fig. 2. If desired, the opening through the shaft may be taken advantage of to insert a reinforcing member 60' into the core during its formation. This reinforcing member may be of any suitable material, as, for instance, it may take the form of a strip of paper or burlap, and it will occupy the center of the core in the finished product, extending from end to end thereof.

The shaft may also be provided with a jacket as indicated at 60, by which steam or other heating medium may be admitted so as to heat the shaft and also the mandrels 39 and 41. Similarly, the mixing hopper 32 may be jacketed, as indicated at 61, and the extension 38 may also be jacketed, as indicated at 62. This heating is not necessary in connection with some core materials, as, for example, I have found it possible to extrude mixtures of asphalt of proper characteristics and asbestos sand substantially at room temperature. In the operation of the device also, the parts soon become heated up to a sufficient extent to permit the continuous extrusion of the material without interruption due to stiffening.

In Fig. 3 there is illustrated a modified form of the extrusion device, and in this device the extension 38 is provided with a tapering outlet nozzle 63, the shaft 35 being supported within the outlet extension 38 in a suitable bearing bracket 64. The material forced through the extension by the conveyor screw 37 passes outwardly through the nozzle 63 and leaves the latter through a suitable orifice. For example, the nozzle may have a series of holes 65 arranged in a row, as shown in Fig. 5, so as to produce a series of rods of the core material laid side by side in a plane. In order to wrap the core, the supply roll 44 is carried on a stud 45 which is mounted on a rotary plate 66, this plate being rotated from any suitable source of power. The wrapping web 43 is drawn from the supply and wrapped around the extension 38, producing a jacket in the form of a spirally wrapped tube which is moved over the surface of the extension by guide and feeding rolls 67 driven from any suitable source of power. The plate 66 may also be provided with a guide roll 68 mounted on a suitable bracket and arranged to lay the web properly in position. The shape of the nozzle 63 varies in cross-section, but its circumferential dimension remains substantially the same, so that the spiralled jacket tube laid by the rotation of the plate 66 will encase the core tightly after being led off the end of the nozzle. From the end of the extension 63 the extruded core and its wrapping are passed through rolls 47, 48, and the other devices, according to the process as previously described.

To provide reinforcement for the material, supply rolls 69 may be employed, these rolls being mounted on stationary axes at any convenient point and the strips being drawn from them over the surface of the extension 63 so as to be encased within the spiral wrapping 43. In the formation of the finished article, the strips 70 drawn from the supply roll 60 will lie on either face of the core against the inner surface of the wrapping, as illustrated in Fig. 10. Instead of using an outlet orifice, as shown in Fig. 5, those illustrated in Figs. 12 and 13 may similarly be used. That shown in Fig. 12 is in the form of a narrow elongated slot 71, thicker at one end than at the other, and giving the core a tapering cross-section. In Fig. 13 there is shown a somewhat similar orifice plate in which there are three slots, a central slot 72 of considerable length, and shorter slots 73 placed on either side of the latter at one end thereof. The core produced by the extrusion of the material through the slots 72 and 73 is of a form which permits a tapered article to be readily formed from it.

In Fig. 11 there is shown a non-continuous extrusion apparatus, in which there is a chamber 74 having an outlet opening 75 which may be covered by a closure member 76. Within the chamber is a reciprocating plunger 77 and the chamber has a tapering outlet extension 63 similar to that shown in Fig. 3. The wrapping of the jacket is also carried on in the same manner as is illustrated in connection with the apparatus shown in Fig. 3. The apparatus shown in Fig. 11 is operated by withdrawing the plunger 77 to its extreme retracted position, whereupon a charge of the material is introduced through the opening 75. The closure is then put in place and the plunger 77 driven forward to extrude the material through the outlet orifice. A block of the material always remains in the end of the chamber beyond the piston at 78, so that no breaks in the core result from the intermittent operation. The chamber in which the piston moves may be jacketed, as indicated at 79.

The finished product produced in indefinite lengths may have a surfacing of granular material on both faces, as indicated in Figs. 8 and 10, or the granular wear surface may be applied only over the face which is to be exposed to the weather, or, if desired, only over a part of that face. The rear face is normally covered with talc or some other material so that the articles may be bundled together without sticking. It is preferable to produce the product in tapered cross-section so that the elements, when in place on the roof appear to have thick butts, and in some instances it may be desirable to make use of the reinforcing wire 31. This is applied with the mechanism illustrated by drawing wire from a supply and laying it beneath the web 43 as the latter is laid about the core or about the tubular extension 63. Also, instead of using a single wrapping strip, two supplies may be employed and these may be arranged for delivery so that the successive thicknesses of the wrapper are wound helically about the core but have the reverse lay.

The new apparatus provides a rapid and inexpensive method of producing the new building product and it is relatively simple in construction and easy to operate. This apparatus may be operated for indefinite periods without interruption as the materials may be continuously supplied to it, without the necessity of shutting down. Accordingly, the new product may be made at a high output rate.

I claim:

1. Apparatus for manufacturing building products which comprises means for extruding plastic material through an orifice to form a core of indefinite length, a device disposed adjacent the orifice for wrapping a jacket strip about the extruded core immediately upon its leaving the orifice, and means for applying shaping pressure to the wrapping core to consolidate it and give it a selected shape.

2. Apparatus for manufacturing building products which comprises means for extruding plastic material through an orifice to form a core of indefinite length, a device adjacent the orifice for wrapping a jacket strip in a plurality of convolutions about the core immediately as the core leaves the orifice, and means for applying shaping pressure to the wrapped core to consolidate the latter and give it a predetermined cross-section.

3. Apparatus for manufacturing building products which comprises means for extruding plastic material through an orifice to form a core of indefinite length, a device adjacent the orifice for wrapping a jacket strip about the core immediately as the core leaves the orifice, means for applying shaping pressure to the core to consolidate the core and jacket and to give the jacketed core a selected shape, and means for cutting notches in one edge of the shaped jacketed core.

4. Apparatus for manufacturing building products which comprises means for extruding plastic material through an annular orifice, a device for wrapping a strip about the tube of extruded material to form a continuous covering therefor, the device being arranged to apply the strip to the tube immediately after the tube leaves the orifice, and means for applying shaping pressure to the wrapped tube to collapse the latter to close the central void and to give the collapsed tube a selected shape.

5. In apparatus for manufacturing building products the combination of a casing, a rotary shaft within the casing terminating in a mandrel rotating therewith and cooperating with the casing wall to define an annular orifice, the said mandrel projecting from the casing through said orifice, an opening in the casing for introducing material to be acted on, and means carried by the shaft for conveying material through the casing and discharging it through the orifice in tubular form.

6. In apparatus for manufacturing building products the combination of a casing, an orifice in the casing wall, an opening in the casing for the introduction of material to be acted on, means within the casing for extruding the material through the orifice including a rotary mandrel partially defining the orifice and extending therethrough out of the casing, and means for applying a wrapping about the extruded material in a plurality of convolutions.

7. In apparatus for manufacturing building products the combination of a casing, an annular orifice in the casing wall, said orifice being in part defined by a rotating mandrel projecting out of the casing through said orifice, an opening in the casing for the introduction of material to be acted on, means within the casing for extruding material through the orifice in the form of a tube, wrapping means for applying a strip about the tube of extruded material in a plurality of convolutions, shaping rolls for collapsing the wrapped tube to close the central void and cutting devices for cutting the extruded material into selected lengths.

8. In apparatus for manufacturing building products the combination of a casing, an orifice in the casing wall, an opening in the casing for the introduction of material to be acted on, means for forcing the material out of the casing through the orifice, said means including a rotary mandrel in part defining said orifice, means for applying a reinforcing strip lengthwise of the discharged material, and means for wrapping a jacket strip about the discharged material in a plurality of convolutions, the strip encasing the reinforcing strip.

9. Apparatus for manufacturing building products which comprises means for forming a plurality of rod-like masses of plastic material, a device for wrapping a strip about these masses to form a continuous covering therefor, and means for consolidating the several masses into a single mass and for forming the said mass to a selected shape.

10. Apparatus for manufacturing building products which comprises means for continuously forming a plurality of rod-like masses of plastic material by an extrusion operation, a device for wrapping a strip about these masses to form a continuous covering therefor, the said device applying the strip to the said masses immediately upon their leaving the extrusion means and forming a support therefor, and means for consolidating the several masses into a single body.

11. Apparatus for manufacturing building products which comprises a nozzle having a plurality of orifices, means for simultaneously forcing plastic material through said orifices, a device for wrapping a strip about the extruded material to form a continuous covering therefor, the said device operating to apply the strip to the extruded material immediately as it leaves the nozzle, and means for consolidating the extruded material to form a single core and forming this core to a selected shape.

12. Apparatus for manufacturing building products which comprises means for forming a plurality of rod-like masses of plastic material, means for winding a strip of flexible material around the said masses as rapidly as they are formed to provide a covering therefor, and means for incorporating a reinforcing material in the product produced by the action of the preceding means.

13. Apparatus for manufacturing building products which comprises means for forming a plurality of rod-like masses of plastic material, means for winding a strip of flexible material around the said masses as rapidly as they are formed to provide a covering therefor, and means for applying a reinforcing member to the covering thus produced.

14. Apparatus for manufacturing building products which comprises means for forming a plurality of rod-like masses of plastic material, means for winding a strip of flexible material around the said masses as rapidly as they are formed to provide a covering therefor, and means for winding a reinforcing strand about the said covering.

15. Apparatus for manufacturing building products which comprises means for continuously forming a plurality of rod-like masses of plastic material, a rotary support for the masses so formed over which support said masses are moved by the forming means, a device for wrapping a strip about the masses to form a continuous covering therefor, said device applying the strip to the masses immediately upon their leaving said support, and means for consolidating the wrapped masses within the covering into a single body of selected shape.

16. Apparatus for manufacturing building products which comprises the combination of a casing having an opening, a rotary mandrel disposed in the opening and with the latter defining an annular orifice, rotary means within the casing for forcing material therefrom through the said orifice over the surface of the mandrel, and means for wrapping a strip about the annular extruded mass immediately as it leaves said orifice and while it is supported on said mandrel.

In testimony whereof I affix my signature.

THOMAS ROBINSON.